United States Patent [19]
Miller

[11] 3,836,728

[45] Sept. 17, 1974

[54] TELEPHONE RINGER SHARING ARRANGEMENT

[75] Inventor: Harlan E. Miller, Old San Juan, P.R.

[73] Assignee: International Telephone and Telegraph Corporation, Nutley, N.J.

[22] Filed: Feb. 14, 1973

[21] Appl. No.: 332,466

[52] U.S. Cl. .................................. 179/84 R, 179/99
[51] Int. Cl. .............................................. H04m 3/02
[58] Field of Search ......... 179/99, 17 E, 84 L, 84 R

[56] References Cited

UNITED STATES PATENTS

| | | | |
|---|---|---|---|
| 1,860,007 | 5/1932 | Bascom | 179/84 L |
| 1,967,404 | 7/1934 | Gretener | 179/84 L |
| 3,230,316 | 1/1966 | Hunt | 179/84 R |
| 3,730,999 | 5/1973 | Shaffer | 179/84 R |

*Primary Examiner*—Kathleen H. Claffy
*Assistant Examiner*—Mitchell Saffian
*Attorney, Agent, or Firm*—John T. O'Halloran; Menotti J. Lombardi, Jr.

[57] ABSTRACT

This telephone ringer arrangement permits two or more telephone lines to share a single ringer and ringer multiplier. A neon lamp is connected to the ring side of the telephone line and in series with the telephone ringer. Additional neon lamps are connected in parallel to additional telephone lines, while also being connected in series with the same ringer. Use of, for example, NE2H high voltage neon lamps allows enough current to pass to operate the ringer, while a particular one does not interfere with the associated lines as it will not ring through the neon of another line.

3 Claims, 4 Drawing Figures

TELEPHONE RINGER SHARING ARRANGEMENT

This invention relates to apparatus whereby a plurality of telephone lines are connected to one ringer in multiline key sets.

A principal object of the invention is to allow two or more telephone lines to share a single ringer.

Another object is to provide such an arrangement wherein there is posed no interference to other lines in use on the same ringer.

It is a further object of the invention to require no modification of existing telephone circuitry, with the invention comprising the inclusion of a simple and inexpensive ringer multiplier arrangement which is small and lightweight and which can fit into a telephone set casing.

According to the broader aspects of the invention there is provided a ringer multiplier arrangement for permitting a plurality of telephone lines to share the same ringer, comprising a single ringer and a plurality of two-terminal threshold discharge isolation devices in one-to-one correspondence with said plurality of telephone lines, said two-terminal devices being coupled between said plurality of telephone lines and said single ringer such that each said device is connected to the ring side of its associated telephone line and in series with said single ringer while also being coupled in parallel with the other said devices.

This arrangement employs a NE2H neon lamp connected to the ring side of the telephone line and in series with the telephone ringer. Additional neon lamps are connected in parallel to additional telephone lines. All the lamps are connected in series with the same ringer.

Among the features of the invention, the apparatus is small enough to fit inside existing key phones, and as such may be mounted without modifying the phone. This may be effected, for example, by having the unit contained in a potted compound with an adhesive coating on one side thereof which would hold it firmly to the inside of the phone case.

Another feature of the invention is that a unit for use with, for example, five lines would have very low manufacturing cost (typically less than $1.00).

The above-mentioned and other objects and features of the invention will become more apparent by referring to the following description taken in conjunction with the accompanying drawings, in which.

Figures 1, 2A, 2B:
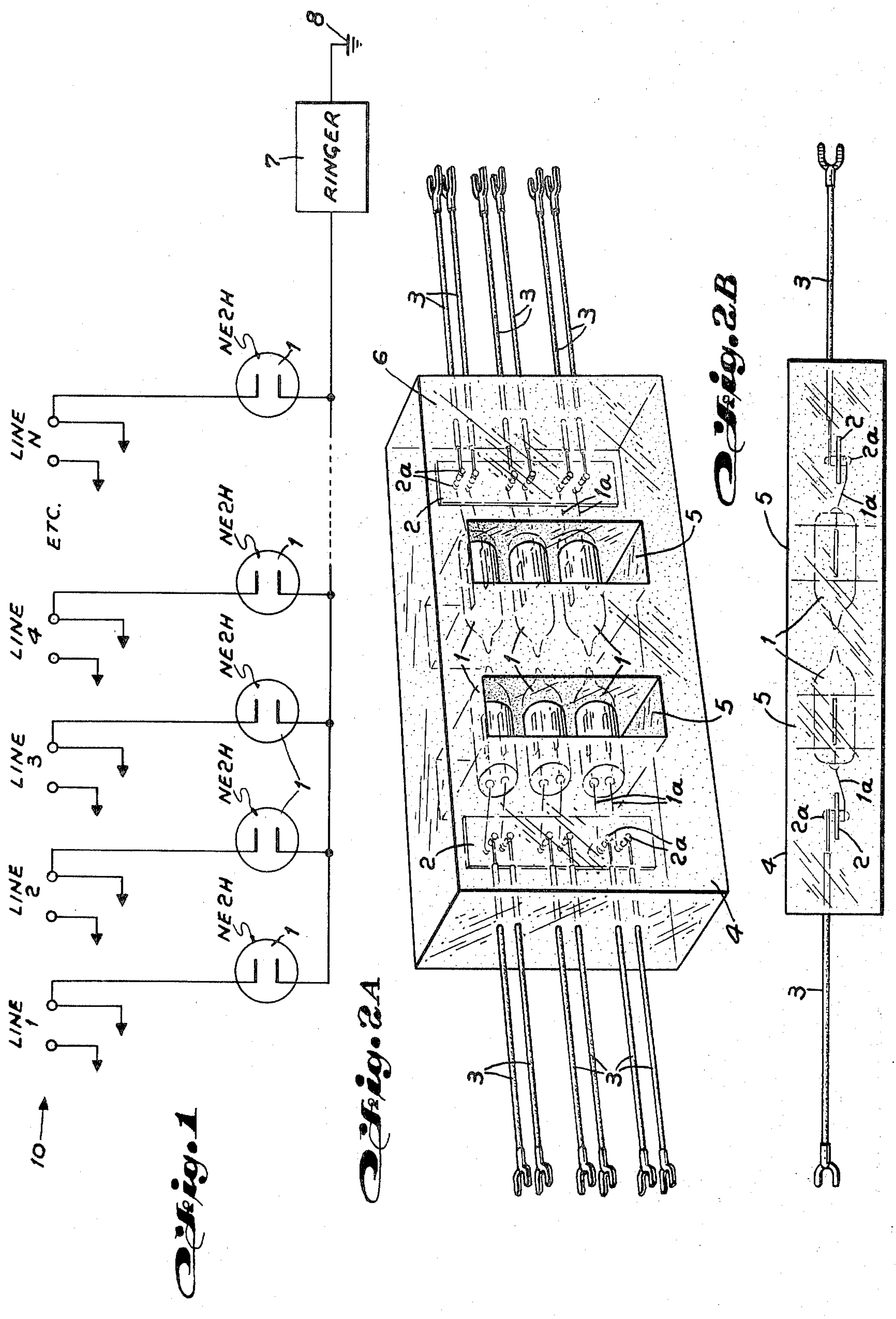
FIG. 1 is a highly schematic illustration of the ringer multiplier circuit according to the invention.
FIGS. 2A and 2B are respectively plan and side views embodying the schematic arrangement of FIG. 1.

FIG. 1 in a highly schematic representation illustrates the invention in relation to a single ringer circuit and a plurality of subscriber lines. A neon lamp 1 preferably of the type NE2H is coupled to the ring side of each of the subscriber lines, generally indicated at 10; the other terminal of the neon lamps 1 are in turn coupled together and to one side of the common ringer circuit 7, which in turn is coupled also to ground 8. Ringer 7 is typically of a high impedance biased type and non-polarized.

The NE2H neon lamps 1 each allow enough current to pass to operate the ringer 7, but do not ring through the neons of the other lines. This is primarily due to the fact that the NE2H lamp is a high wattage neon lamp. Ordinarily, neon lamps would not work well in this type of application where satisfactory line isolation is required.

Referring specifically to FIGS. 2A and 2B, there is illustrated in plan and side views respectively a representative embodiment of the schematic illustration of FIG. 1 according to the invention. A plurality of neon lamps 1 are basically arranged in two parallel rows of three each in a clear potting compound 4. The terminals **1*a* of the neon lamps 1 are each coupled to respective pins 2*a* of terminal boards 2, which in turn are coupled to respective terminal leads 3 which extend longitudinally from the ends of the potting block 4. A pair of rectangular shaped apertures 5 through the potting compound are provided in the proximate area of the neon lamps 1, and partially exposing same, for purposes of heat dissipation. To one of the broad flat surfaces of the rectangular block of clear potting compound 4** is applied an adhesive coating to facilitate the easy mounting of the unit on the inner surface of a phone casing. Typically, the unit is intended to have a maximum longitudinal dimension of less than 3 inches and a height of ½ inch or less, with a width approximating 1¼ inches.

Figure 3:
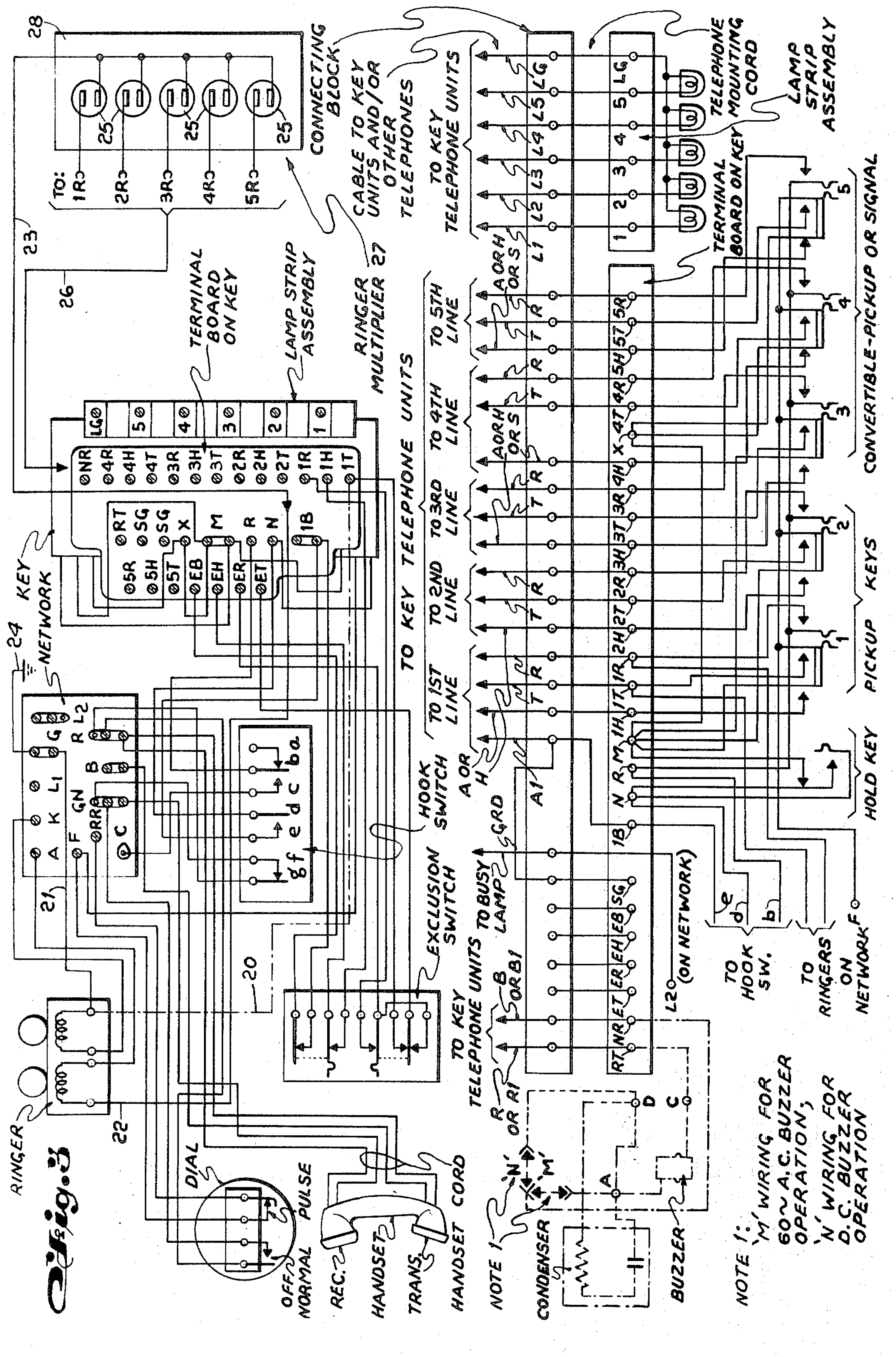
FIG. 3 is an existing telephone circuit diagram showing the ringer multiplier arrangement of FIGS. 1 and 2 incorporated therein.

Referring now to FIG. 3 a circuit diagram of an existing type telephone is illustrated, showing the inclusion of the ringer multiplier unit according to the invention. To this conventional telephone circuit diagram a minimum amount of installation is required as may be seen in FIG. 3 from the inclusion of the ringer multiplier unit 27. By inclusion of this unit there is achieved a telephone arrangement serving several lines using only one ringer and a ringer multiplier. More specifically, the ringer multiplier 27, including the potted block 28 housing five neon lamps 25, is shown with one lead of each of the lamps 25 coupled together and extending by way of lead 23 to be coupled to the line 22 running to the ringer circuit of the conventional telephone arrangement. The other leads of the neon lamps respectively are coupled to the 1R–5R terminals of the terminal board on key of the telephone arrangement, as illustrated by the general lead 26 in FIG. 3. The ringer circuit of the existing arrangement is treated in that the lead 20 formerly coupled to the terminal 1T is removed from this terminal and instead coupled to terminal G of the network as indicated by the solid line lead 21. Terminal G in turn is coupled to ground by way of 24. This treatment is representative of each of the telephone lines, and serves to provide each with the use of the same ringer by way of the ringer multiplier unit 27.

It has been observed conclusively from experiments that when ringing each of three lines connected in accordance with the invention, there is no interference to conversations or dialing on the other associated lines.

The invention has direct application, for instance, to the following:

1. Three line key sets.
2. Two line key sets.
3. Six button relay controlled key sets.

The advantages provided by the invention over existing methods and apparatus are that the ringer multiplier is small enough to fit inside existing key cases. It may be mounted therein without modifying the phone, inasmuch as the ringer multiplier is a clear potted unit with an adhesive coating for holding it firmly to the phone case. Moreover, by the arrangement according to the invention a unit for handling say five lines has extremely low manufacturing costs.

In the above there has been described an arrangement which permits two or more telephone lines to share a single ringer and ringer multiplier. By this arrangement a neon lamp is connected to the ring side of a telephone line and in series with the telephone ringer. Additional neon lamps are connected in parallel to additional telephone lines while also being connected in series with the same ringer. Use of NE2H high voltage neon lamps permits enough current to pass to operate the ringer while providing no interference with the associated lines as it does not ring through the neon of another line.

While I have described above the principles of my invention in connection with specific apparatus, it is to be clearly understood that this description is made only by way of example and not as a limitation to the scope of my invention as set forth in the objects thereof and in the accompanying claims.

I claim:

1. An improved ringer multiplier circuit for key telephones of the type having a key telephone subset and a number of interconnecting telephone subsets, wherein the improvement comprises:

a common ringer at the key telephone subset;

a number of incoming ringer lines corresponding to each interconnected subset; and a number of glow discharge threshold devices coupled in series with said ringer and in multiple with each of said incoming ringer lines wherein said common ringer is capable of being energized by each of said incoming ringer lines, and a signal on one of said incoming ringer lines to one of said subsets is electrically isolated from the rest of said subsets by means of said glow discharge threshold devices.

2. The circuit of claim 1 wherein said glow discharge threshold devices comprise neon lamps.

3. The circuit of claim 2 wherein said neon lamps are arranged within a block of transparent potting compound attached to said key telephone having terminal means extending from said block for providing electrical connection between said lamps and said key telephone.

* * * * *